US008051301B2

(12) United States Patent
Barnes et al.

(10) Patent No.: US 8,051,301 B2
(45) Date of Patent: *Nov. 1, 2011

(54) MEMORY MANAGEMENT SYSTEM AND METHOD PROVIDING LINEAR ADDRESS BASED MEMORY ACCESS SECURITY

(75) Inventors: Brian C. Barnes, Round Rock, TX (US); Geoffrey S. Strongin, Austin, TX (US); Rodney W. Schmidt, Dripping Springs, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 3397 days.

This patent is subject to a terminal disclaimer.

(21) Appl. No.: 10/010,161

(22) Filed: Nov. 13, 2001

(65) Prior Publication Data

US 2003/0093686 A1    May 15, 2003

(51) Int. Cl.
*G06F 11/30* (2006.01)
(52) U.S. Cl. ...................................................... 713/190
(58) Field of Classification Search .................. 713/202, 713/190, 189, 166, 162; 711/152, 163
See application file for complete search history.

(56) References Cited

U.S. PATENT DOCUMENTS

| 5,619,671 A | 4/1997 | Bryant et al. ................ 395/412 |
| 5,627,987 A | 5/1997 | Nozue et al. ................ 395/410 |
| 5,933,627 A * | 8/1999 | Parady ........................ 712/228 |
| 6,052,763 A * | 4/2000 | Maruyama ................... 711/152 |
| 6,154,818 A | 11/2000 | Christie ....................... 711/163 |
| 6,813,699 B1 * | 11/2004 | Belgard ....................... 711/213 |

OTHER PUBLICATIONS

International PCT Search Report PCT/US02/28984 dated Aug. 8, 2003.
Intel Corporation, "Intel Architecture Software Developer's Manual, vol. 3: System Programming Guide, Chapters 2-4, 6, 14, annex B." Intel Ref. Manual XP002248376 (1996).
Huck, J et al., "Introducing the IA-64 Architecture" IEEE Micro, IEEE Inc., New York, U.S> vol. 20, No. 5, Sep. 2000 pp. 12-23, XP000976142.
European Search Report EP 0 768 594A1 dated Oct. 26, 2005.

* cited by examiner

*Primary Examiner* — Eleni Shiferaw
*Assistant Examiner* — Ali Abyaneh
(74) *Attorney, Agent, or Firm* — Williams, Morgan & Amerson

(57) ABSTRACT

A memory management unit (MMU) is disclosed for managing a memory storing data arranged within a plurality of memory pages. The MMU includes a security check unit (SCU) receiving a linear address generated during execution of a current instruction. The linear address has a corresponding physical address residing within a selected memory page. The SCU uses the linear address to access one or more security attribute data structures located in the memory to obtain a security attribute of the selected memory page. The SCU compares a numerical value conveyed by a security attribute of the current instruction to a numerical value conveyed by the security attribute of the selected memory page, and produces an output signal dependent upon a result of the comparison. The MMU accesses the selected memory page dependent upon the output signal.

37 Claims, 11 Drawing Sheets

PAGE DIRECTORY ENTRY FORMAT 200:

| PAGE TABLE BASE ADDRESS | | U/S | R/W | |
|---|---|---|---|---|

FIG. 2
(PRIOR ART)

PAGE TABLE ENTRY FORMAT 300:

| PAGE FRAME BASE ADDRESS | | U/S | R/W | |
|---|---|---|---|---|

FIG. 3
(PRIOR ART)

MEMORY MANAGEMENT SYSTEM AND METHOD PROVIDING LINEAR ADDRESS BASED MEMORY ACCESS SECURITY

REFERENCES

This patent application is related to a co-pending patent application Ser. No. 10/010,569 entitled "Memory Management System and Method Providing Physical Address Based Memory Access Security" by Brian C. Barnes, Geoffrey S. Strongin, and Rodney W. Schmidt, filed on the same day as the present patent application.

BACKGROUND OF THE INVENTION

1. Field of the Invention

This invention relates generally to memory management systems and methods, and, more particularly, to memory management systems and methods that provide protection for data stored within a memory.

2. Description of the Related Art

A typical computer system includes a memory hierarchy to obtain a relatively high level of performance at a relatively low cost. Instructions of several different software programs are typically stored on a relatively large but slow non-volatile storage unit (e.g., a disk drive unit). When a user selects one of the programs for execution, the instructions of the selected program are copied into a main memory unit (e.g., random access memory (RAM)), and a central processing unit (CPU) obtains the instructions of the selected program from the main memory unit. A well-known virtual memory management technique allows the CPU to access data structures larger in size than that of the main memory unit by storing only a portion of the data structures within the main memory unit at any given time. Remainders of the data structures are stored within the relatively large but slow non-volatile storage unit, and are copied into the main memory unit only when needed.

Virtual memory is typically implemented by dividing an address space of the CPU into multiple blocks called page frames or "pages." Only data corresponding to a portion of the pages is stored within the main memory unit at any given time. When the CPU generates an address within a given page, and a copy of that page is not located within the main memory unit, the required page of data is copied from the relatively large but slow non-volatile storage unit into the main memory unit. In the process, another page of data may be copied from the main memory unit to the non-volatile storage unit to make room for the required page.

The popular 80x86 (x86) processor architecture includes specialized hardware elements to support a protected virtual address mode (i.e., a protected mode). FIGS. 1-3 will now be used to describe how an x86 processor implements both virtual memory and memory protection features. FIG. 1 is a diagram of a well-known linear-to-physical address translation mechanism 100 of the x86 processor architecture. An address translation mechanism 100 is embodied within an x86 processor, and involves a linear address 102 produced within the x86 processor, a page table directory (i.e., a page directory) 104, multiple page tables including a page table 106, multiple page frames including a page frame 108, and a control register (CR3) 110. The page directory 104 and the multiple page tables are paged memory data structures created and maintained by operating system software (i.e., an operating system). The page directory 104 is always located within the memory (e.g., the main memory unit). For simplicity, the page table 106 and the page frame 108 will also be assumed to reside in the memory.

As indicated in FIG. 1, the linear address 102 is divided into three portions to accomplish the linear-to-physical address translation. The highest ordered bits of the CR3 110 are used to store a page directory base register. The page directory base register is a base address of a memory page containing the page directory 104. The page directory 104 includes multiple page directory entries, including a page directory entry 112. An upper "directory index" portion of the linear address 102, including the highest ordered or most significant bits of the linear address 102, is used as an index into the page directory 104. The page directory entry 112 is selected from within the page directory 104 using the page directory base address of the CR3 110 and the upper "directory index" portion of the linear address 102.

FIG. 2 is a diagram of a page directory entry format 200 of the x86 processor architecture. As indicated in FIG. 2, the highest ordered (i.e., most significant) bits of a given page directory entry contain a page table base address, where the page table base address is a base address of a memory page containing a corresponding page table. The page table base address of the page directory entry 112 is used to select the corresponding page table 106.

Referring back to FIG. 1, the page table 106 includes multiple page table entries, including a page table entry 114. A middle "table index" portion of the linear address 102 is used as an index into the page table 106, thereby selecting the page table entry 114. FIG. 3 is a diagram of a page table entry format 300 of the x86 processor architecture. As indicated in FIG. 3, the highest ordered (i.e., most significant) bits of a given page table entry contain a page frame base address, where the page frame base address is a base address of a corresponding page frame.

Referring again to FIG. 1, the page frame base address of the page table entry 114 is used to select the corresponding page frame 108. The page frame 108 includes multiple memory locations. A lower or "offset" portion of the linear address 102 is used as an index into the page frame 108. When combined, the page frame base address of the page table entry 114 and the offset portion of the linear address 102 produce the physical address corresponding to the linear address 102, and indicate a memory location 116 within the page frame 108. The memory location 116 has the physical address resulting from the linear-to-physical address translation.

Regarding the memory protection features, the page directory entry format 200 of FIG. 2 and the page table entry format 300 of FIG. 3 include a user/supervisor (U/S) bit and a read/write (R/W) bit. The contents of the U/S and R/W bits are used by the operating system to protect corresponding page frames (i.e., memory pages) from unauthorized access. U/S=0 is used to denote operating system memory pages, and corresponds to a "supervisor" level of the operating system. The supervisor level of the operating system corresponds to a current privilege level 0 (CPL0) of software programs and routines executed by the x86 processor. U/S=1 is used to indicate user memory pages, and corresponds to a "user" level of the operating system. The user level of the operating system corresponds to CPL3 of the x86 processor. (The user level may also correspond to CPL1 and/or CPL2 of the x86 processor.)

The R/W bit is used to indicate types of accesses allowed to the corresponding memory page. R/W=0 indicates the only read accesses are allowed to the corresponding memory page (i.e., the corresponding memory page is "read-only"). R/W=1 indicates that both read and write accesses are allowed to the corresponding memory page (i.e., the corresponding memory page is "read-write").

During the linear-to-physical address translation operation of FIG. 1, the contents of the U/S bits of the page directory entry 112 and the page table entry 114, corresponding to the page frame 108, are logically ANDed to determine if the access to the page frame 108 is authorized. Similarly, the contents of the R/W bits of the page directory entry 112 and the page table entry 114 are logically ANDed to determine if the access to the page frame 108 is authorized. If the logical combinations of the U/S and R/W bits indicate the access to the page frame 108 is authorized, the memory location 116 is accessed using the physical address. On the other hand, if the logical combinations of the U/S and R/W bits indicate that the access to the page frame 108 is not authorized, the memory location 116 is not accessed, and a protection fault indication is signaled.

Unfortunately, the above described memory protection mechanisms of the x86 processor architecture are not sufficient to protect data stored in the memory. For example, any software program or routine executing at the supervisor level (e.g., having a CPL of 0) can access any portion of the memory, and can modify (i.e., write to) any portion of the memory that is not marked "read-only" (R/W=0). In addition, by virtue of executing at the supervisor level, the software program or routine can change the attributes (i.e., the U/S and R/W bits) of any portion of the memory. The software program or routine can thus change any portion of the memory marked "read-only" to "read-write" (R/W=1), and then proceed to modify that portion of the memory.

The present invention is directed to a method that may solve, or at least reduce, some or all of the aforementioned problems, and systems incorporating the method.

SUMMARY OF THE INVENTION

A memory management unit is disclosed for managing a memory storing data arranged within a plurality of memory pages. The memory management unit includes a security check unit receiving a linear address generated during execution of a current instruction. The linear address has a corresponding physical address residing within a selected memory page. The security check unit uses the linear address to access one or more security attribute data structures located in the memory to obtain a security attribute of the selected memory page. The security check unit compares a numerical value conveyed by a security attribute of the current instruction to a numerical value conveyed by the security attribute of the selected memory page, and produces an output signal dependent upon a result of the comparison. The memory management unit accesses the selected memory page dependent upon the output signal.

A central processing unit (CPU) is described including an execution unit and the above described memory management unit (MMU). The execution unit fetches instructions from a memory and executes the instructions. The MMU manages the memory, and is configurable to manage the memory such that the memory stores data arranged within multiple memory pages. The MMU includes the above described security check unit. A computer system is described including the memory, the CPU, and the MMU.

A method is described for providing access security for a memory used to store data arranged within a plurality of memory pages. The method includes receiving a linear address produced during execution of an instruction, and a security attribute of the instruction, wherein the instruction resides in a first memory page. The linear address is used to access one or more paged memory data structures located in the memory to obtain a base address of a selected memory page, and security attributes of the selected memory page. If the security attribute of the instruction (e.g., a current privilege level or CPL of the instruction as defined by the x86 processor architecture) and the security attributes of the selected memory page (e.g., x86 U/S and R/W bits of the selected memory page) indicate the access is authorized, the base address of the selected memory page is combined with an offset to produce a physical address within the selected memory page. If the security attribute of the instruction and the security attributes of the selected memory page indicate the access is not authorized, a fault signal (e.g., an x86 GPF signal) is generated.

The linear address is also used to access one or more security attribute data structures located in the memory to obtain an additional security attribute of the first memory page, and an additional security attribute of the selected memory page. A numerical value conveyed by an additional security attribute of the first memory page is compared to a numerical value conveyed by the additional security attribute of selected memory page. The selected memory page is accessed dependent upon a result of the comparing of the numerical values conveyed by the security attribute of the first memory page and the additional security attribute of selected memory page.

BRIEF DESCRIPTION OF THE DRAWINGS

The invention may be understood by reference to the following description taken in conjunction with the accompanying drawings, in which like reference numerals identify similar elements, and in which:

FIG. 2 is a diagram of a page directory entry format of the x86 processor architecture;

FIG. 3 is a diagram of a page table entry format of the x86 processor architecture;

Figure 1:
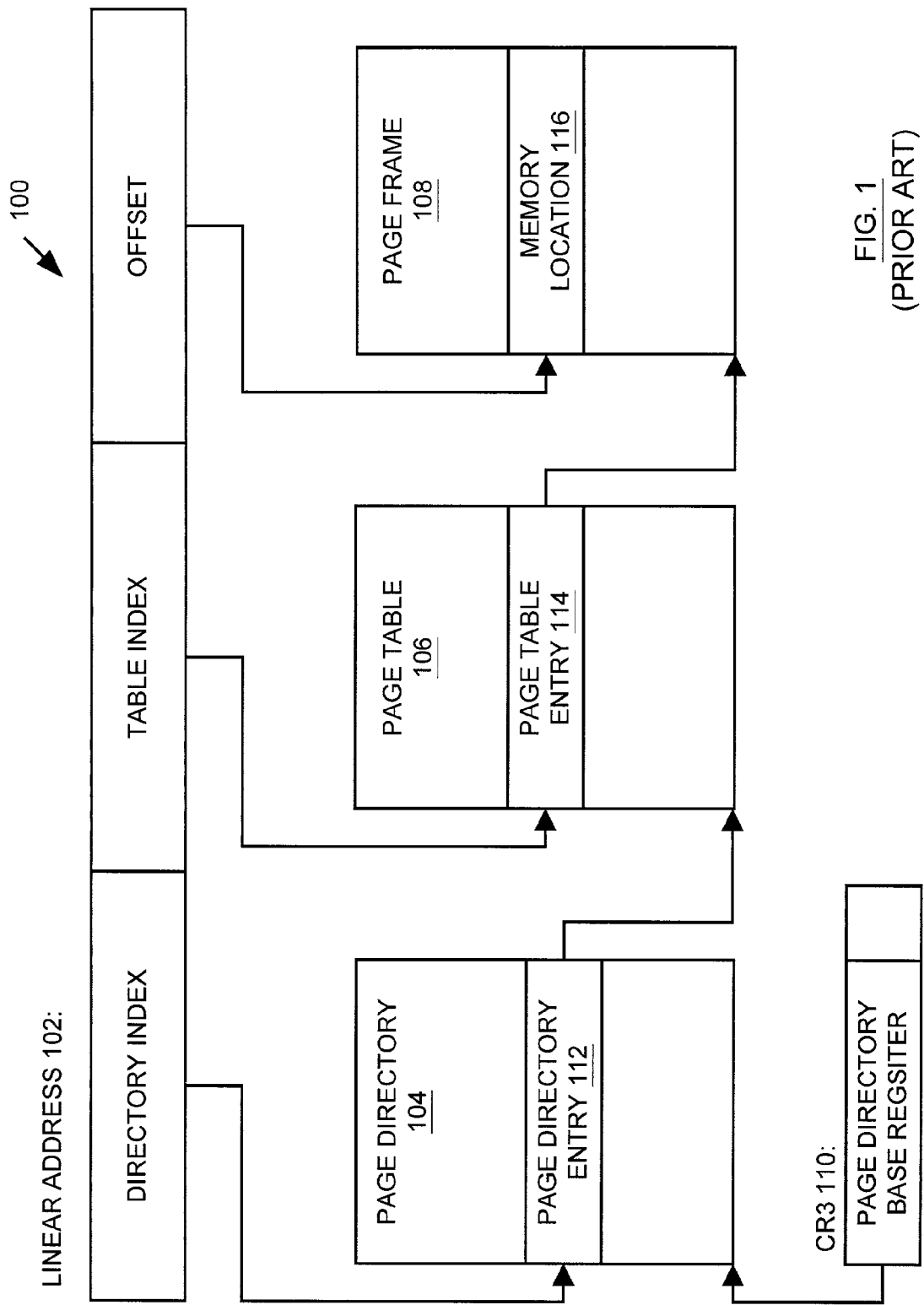
FIG. 1 is a diagram of a well-known linear-to-physical address translation mechanism of the x86 processor architecture.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
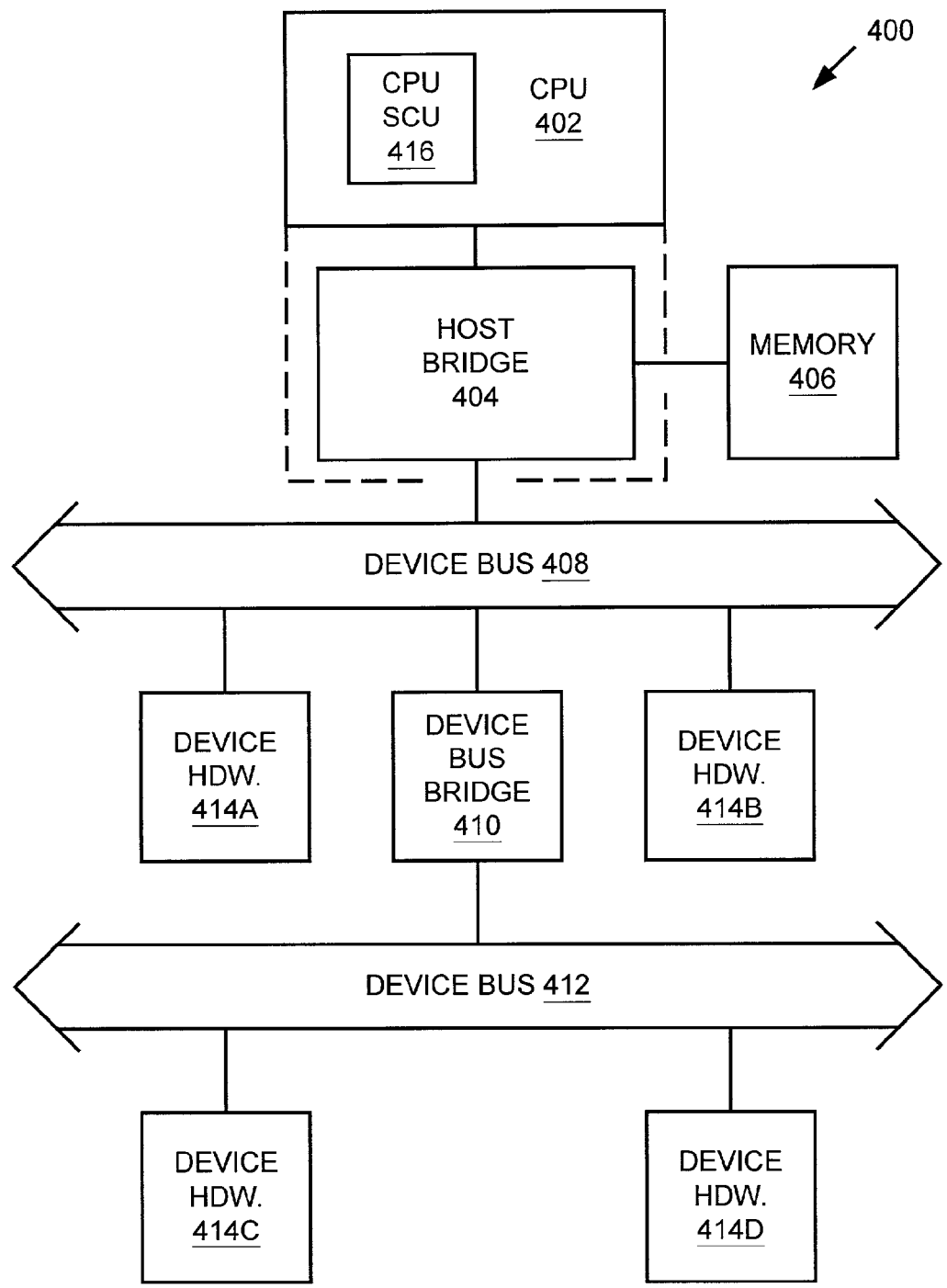
FIG. 4 is a diagram of one embodiment of a computer system including a CPU, wherein the CPU includes a CPU security check unit (SCU)

FIG. 4 is a diagram of one embodiment of a computer system 400 including a CPU 402, a system or "host" bridge 404, a memory 406, a first device bus 408 (e.g., a peripheral component interconnect or PCI bus), a device bus bridge 410, a second device bus 412 (e.g., an industry standard architecture or ISA bus), and four device hardware units 414A-414D. The host bridge 404 is coupled to the CPU 402, the memory 406, and the first device bus 408. The host bridge 404 translates signals between the CPU 402 and the first device bus 408, and operably couples the memory 406 to the CPU 402 and to the first device bus 408. The device bus bridge 410 is coupled between the first device bus 408 and the second device bus 412, and translates signals between the first device bus 408 and the second device bus 412. In the embodiment of FIG. 4, the device hardware units 414A and 414B are coupled to the first device bus 408, and the device hardware units 414C and 414D are coupled to the second device bus 412. One or more of the device hardware units 414A-414D may be, for example, storage devices (e.g., hard disk drives, floppy drives, and CD-ROM drives), communication devices (e.g., modems and network adapters), or input/output devices (e.g., video devices, audio devices, and printers).

In the embodiment of FIG. 4, the CPU 402 includes a CPU security check unit (SCU) 416. As will be described in detail below, the CPU SCU 416 protects the memory 406 from unauthorized accesses generated by the CPU 402. It is noted that in other embodiments, the host bridge 404 may be part of the CPU 402 as indicated in FIG. 4.

Figure 5:
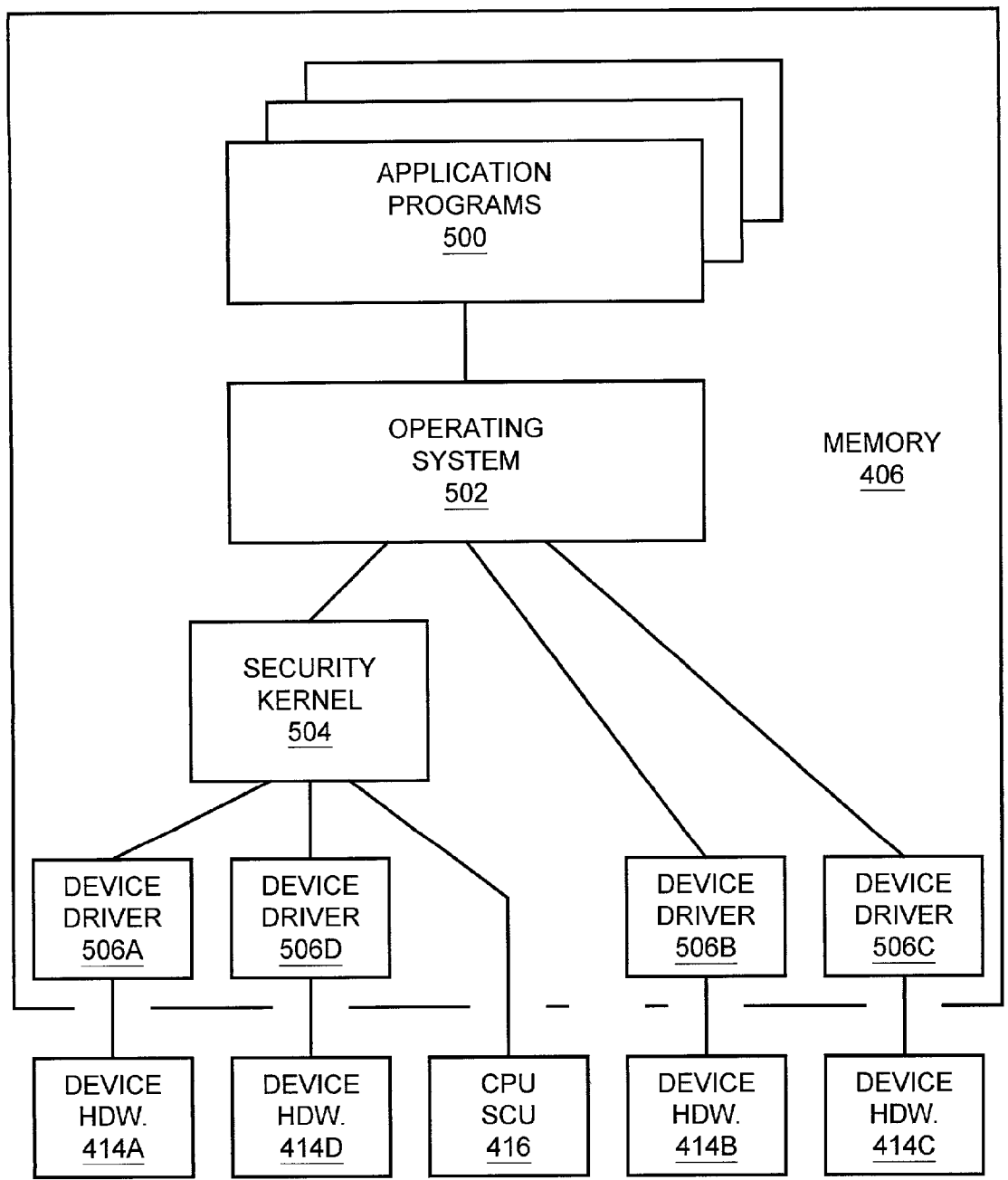
FIG. 5 is a diagram illustrating relationships between various hardware and software components of the computer system of FIG. 4.

FIG. 5 is a diagram illustrating relationships between various hardware and software components of the computer system 400 of FIG. 4. In the embodiment of FIG. 5, multiple application programs 500, an operating system 502, a security kernel 504, and device drivers 506A-506D are stored in the memory 406. The application programs 500, the operating system 502, the security kernel 504, and the device drivers 506A-506D include instructions executed by the CPU 402. The operating system 502 provides a user interface and software "platform" on top of which the application programs 500 run. The operating system 502 may also provide, for example, basic support functions, including file system management, process management, and input/output (I/O) control.

The operating system 502 may also provide basic security functions. For example, the CPU 402 (FIG. 4) may be an x86 processor that executes instructions of the x86 instruction set. In this situation, the CPU 402 may include specialized hardware elements to provide both virtual memory and physical memory protection features in the protected mode as described above. The operating system 502 may be, for example, one of the Windows® family of operating systems (Microsoft Corp., Redmond, Wash.) that operates the CPU 402 in the protected mode, and uses the specialized hardware elements of the CPU 402 to provide both virtual memory and memory protection in the protected mode.

As will be described in more detail below, the security kernel 504 provides additional security functions above the security functions provided by the operating system 502 to protect data stored in the memory 406 from unauthorized access. As indicated in FIG. 5, the security kernel 504 is coupled to the CPU SCU 416. As will be described in detail below, the CPU SCU 416 monitors all software-initiated accesses to the memory 406, and allows only authorized accesses to the memory 406.

In the embodiment of FIG. 5, the device drivers 506A-506D are operationally associated with, and coupled to, the respective corresponding device hardware units 414A-414D. The device hardware units 414A and 414D may be, for example, "secure" devices, and the corresponding device drivers 506A and 506D may be "secure" device drivers. The security kernel 504 is coupled between the operating system 502 and the secure device drivers 506A and 506D, and may monitor all accesses by the application programs 500 and the operating system 502 to secure the device drivers 506A and 506D and the corresponding secure devices 414A and 414D. The security kernel 504 may prevent unauthorized accesses to the secure device drivers 506A and 506D and the corresponding secure devices 414A and 414D by the application programs 500 and the operating system 502. The device drivers 506B and 506C, on the other hand, may be "non-secure" device drivers, and the corresponding device hardware units 414B and 414C may be "non-secure" device hardware units. The device drivers 506B and 506C and the corresponding device hardware units 414B and 414C may be, for example, "legacy" device drivers and device hardware units.

It is noted that in other embodiments, the security kernel 504 may be part of the operating system 502. In yet other embodiments, the security kernel 504, the device drivers 506A and 506D, and/or the device drivers 506B and 506C may be part of the operating system 502.

Figure 6:
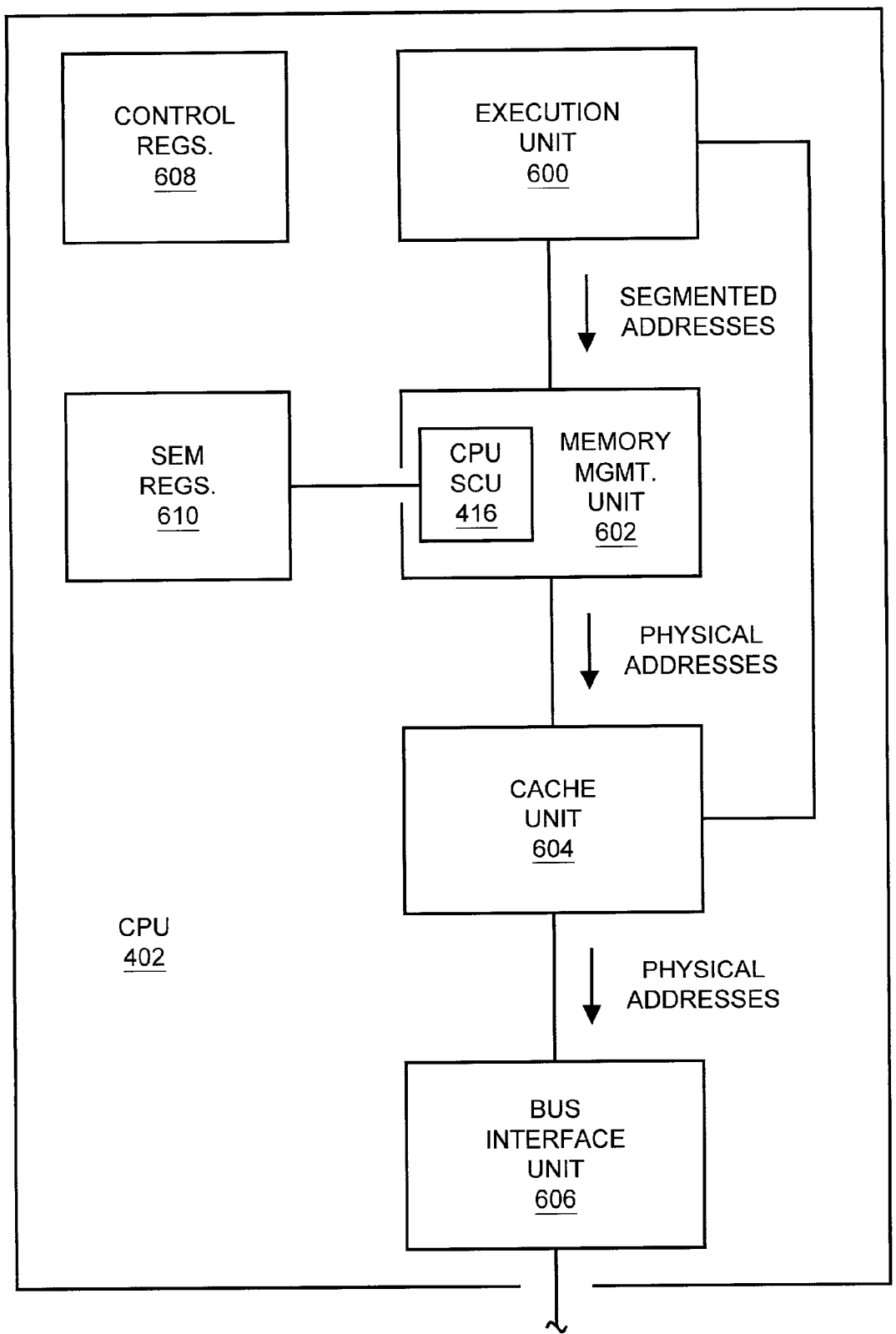
FIG. 6 is a diagram of one embodiment of the CPU of the computer system of FIG. 4, wherein the CPU includes a memory management unit (MMU)

FIG. 6 is a diagram of one embodiment of the CPU 402 of the computer system 400 of FIG. 4. In the embodiment of FIG. 6, the CPU 402 includes an execution unit 600, a memory management unit (MMU) 602, a cache unit 604, a bus interface unit (BIU) 606, a set of control registers 608, and a set of secure execution mode (SEM) registers 610. The CPU SCU 416 is located within the MMU 602. As will be described in detail below, the set of SEM registers 610 are used to implement a secure execution mode (SEM) within the computer system 400 of FIG. 4, and the operation of the CPU SCU 416 is governed by the contents of the set of SEM registers 610. SEM registers 610 are accessed (i.e., written to and/or read from) by the security kernel 504 (FIG. 5). The computer system 400 of FIG. 4 may, for example, operate in the SEM when: (i) THE CPU 402 is an x86 processor operating in the x86 protected mode, (ii) memory paging is enabled, and (iii) the contents of SEM registers 610 specify SEM operation.

In general, the contents of the set of control registers 608 govern operation of the CPU 402. Accordingly, the contents of the set of control registers 608 govern operation of the execution unit 600, the MMU 602, the cache unit 604, and/or the BIU 606. The set of control registers 608 may include, for example, the multiple control registers of the x86 processor architecture.

The execution unit 600 of the CPU 402 fetches instructions (e.g., x86 instructions) and data, executes the fetched instructions, and generates signals (e.g., address, data, and control signals) during instruction execution. The execution unit 600 is coupled to the cache unit 604, and may receive instructions from the memory 406 (FIG. 4) via the cache unit 604 and the BIU 606.

The memory 406 (FIG. 4) of the computer system 400 includes multiple memory locations, each having a unique physical address. When operating in protected mode with paging enabled, an address space of the CPU 402 is divided into multiple blocks called page frames or "pages." As described above, only data corresponding to a portion of the pages is stored within the memory 406 at any given time. In the embodiment of FIG. 6, address signals generated by the execution unit 600 during instruction execution represent segmented (i.e., "logical") addresses. As described below, the MMU 602 translates the segmented addresses generated by the execution unit 600 to corresponding physical addresses of the memory 406. The MMU 602 provides the physical addresses to the cache unit 604. The cache unit 604 is a relatively small storage unit used to store instructions and data recently fetched by the execution unit 600. The BIU 606 is coupled between the cache unit 604 and the host bridge 404, and is used to fetch instructions and data not present in the cache unit 604 from the memory 406 via the host bridge 404.

Figure 7:
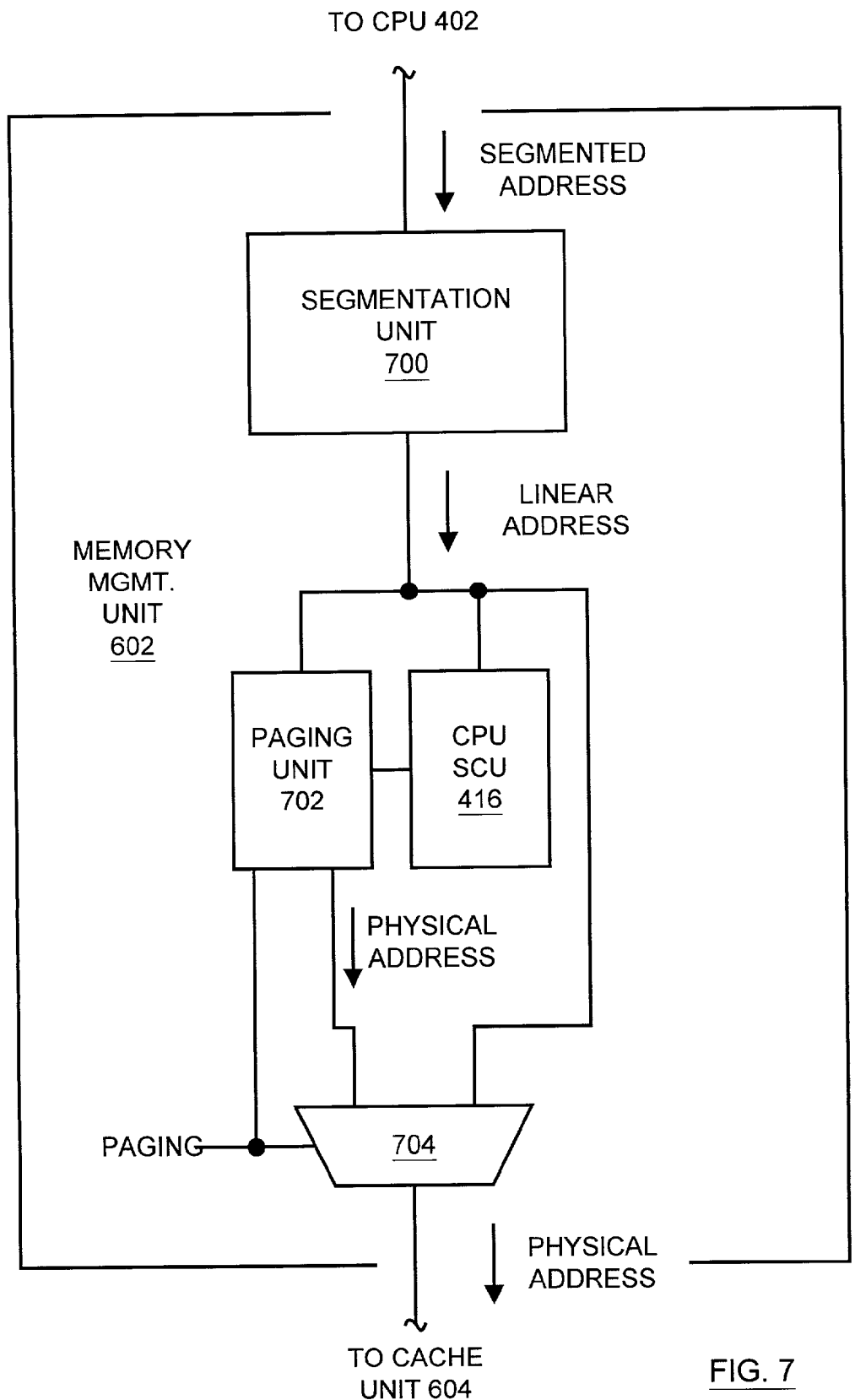
FIG. 7 is a diagram of one embodiment of the MMU of FIG. 6, wherein the MMU includes a paging unit coupled to the CPU SCU.

FIG. 7 is a diagram of one embodiment of the MMU 602 of FIG. 6. In the embodiment of FIG. 7, the MMU 602 includes a segmentation unit 700, a paging unit 702, the CPU SCU 416, and selection logic 704 for selecting between outputs of the segmentation unit 700 and the paging unit 702 to produce a physical address. As indicated in FIG. 7, the segmentation unit 700 receives a segmented address from the execution unit 600 and uses a well-know segmented-to-linear address translation mechanism of the x86 processor architecture to produce a corresponding linear address at an output. As indicated in FIG. 7, when enabled by a "PAGING" signal, the paging unit 702 receives the linear addresses produced by the segmentation unit 700 and produces corresponding physical addresses. The PAGING signal may mirror the paging flag (PG) bit in a control register 0 (CR0) of the x86 processor architecture and of the set of control registers 608 (FIG. 6). When the PAGING signal is deasserted, memory paging is not enabled, and the selection logic 704 produces the linear address received from the segmentation unit 700 as the physical address.

When the PAGING signal is asserted, memory paging is enabled, and the paging unit 702 translates the linear address received from the segmentation unit 700 to a corresponding physical address using the above described linear-to-physical address translation mechanism 100 of the x86 processor architecture (FIG. 1). As described above, during the linear-to-physical address translation operation, the contents of the U/S bits of the selected page directory entry and the selected page table entry are logically ANDed to determine if the access to a page frame is authorized. Similarly, the contents of the R/W bits of the selected page directory entry and the selected page table entry are logically ANDed to determine if the access to the page frame is authorized. If the logical combinations of the U/S and R/W bits indicate the access to the page frame is authorized, the paging unit 702 produces the physical address resulting from the linear-to-physical address translation operation. The selection logic 704 receives the physical address produced by the paging unit 702, produces the physical address received from the paging unit 702 as the physical address, and provides the physical address to the cache unit 604.

On the other hand, if the logical combinations of the U/S and R/W bits indicate the access to the page frame 108 is not authorized, the paging unit 702 does not produce a physical address during the linear-to-physical address translation operation. Instead, the paging unit 702 asserts a general protection fault (GPF) signal, and the MMU 602 forwards the GPF signal to the execution unit 600. In response to the GPF signal, the execution unit 600 may execute an exception handler routine, and may ultimately halt the execution of one of the application programs 500 (FIG. 5) running when the GPF signal was asserted. The paging unit 702 may also include a translation lookaside buffer (TLB) for storing a relatively small number of recently determined linear-to-physical address translations.

Figure 8:
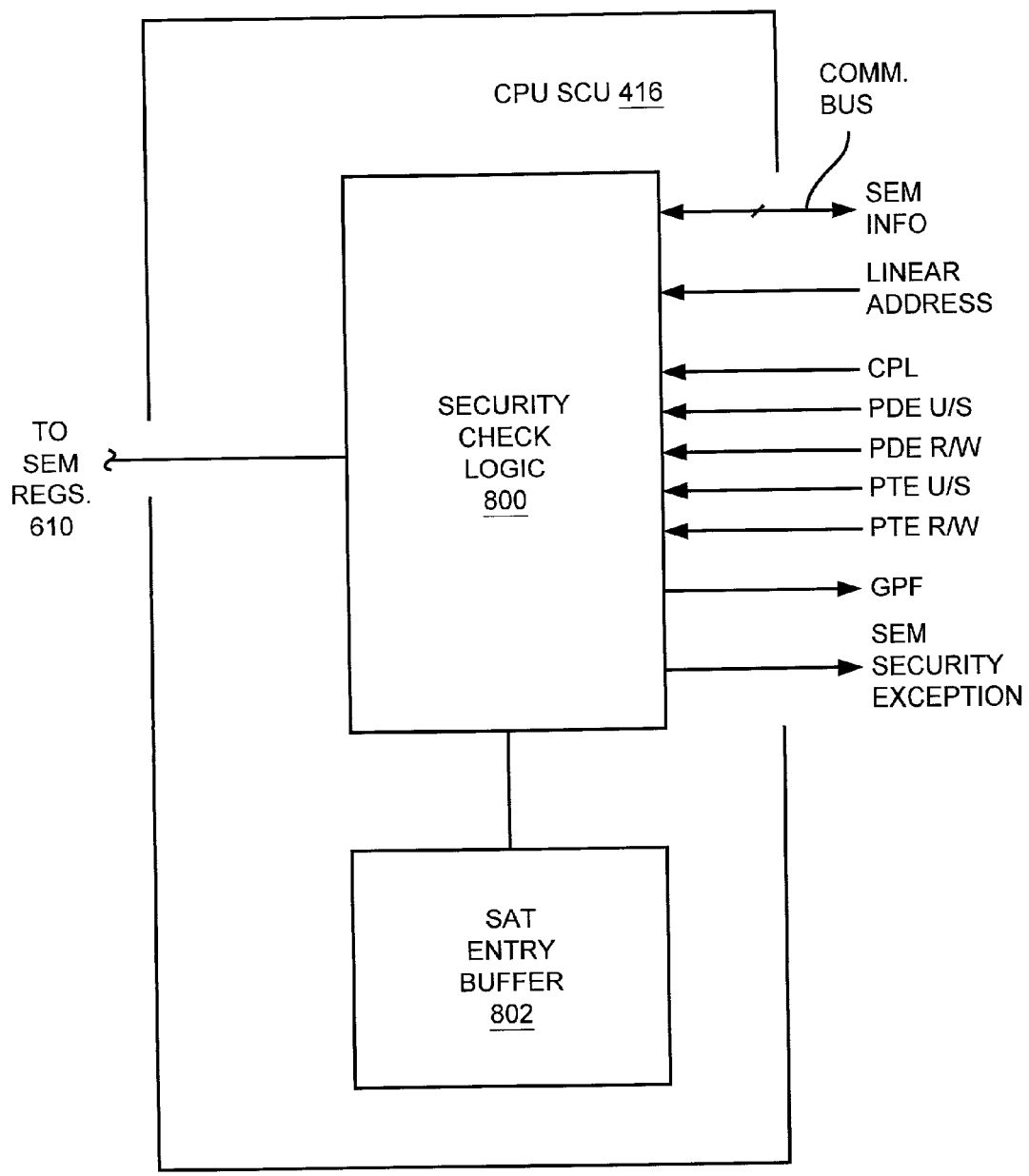
FIG. 8 is a diagram of one embodiment of the CPU SCU of FIG. 7.

FIG. 8 is a diagram of one embodiment of the CPU SCU 416 of FIG. 7. In the embodiment of FIG. 8, the CPU SCU 416 includes security check logic 800 coupled to the set of SEM registers 610 (FIG. 6) and a security attribute table (SAT) entry buffer 802. As described below, SAT entries include additional security information above the U/S and R/W bits of page directory and page table entries corresponding to memory pages. The security check logic 800 uses the additional security information stored within a given SAT entry to prevent unauthorized software-initiated accesses to the corresponding memory page. The SAT entry buffer 802 is used to store a relatively small number of SAT entries of recently accessed memory pages.

As described above, the set of SEM registers 610 are used to implement a secure execution mode (SEM) within the computer system 400 of FIG. 4. The contents of the set of SEM registers 610 govern the operation of the CPU SCU 416. The security check logic 800 receives information to be stored in the SAT entry buffer 802 from the MMU 602 via a communication bus indicated in FIG. 8. The security check logic 800 also receives a physical address produced by the paging unit 702.

Figure 9:
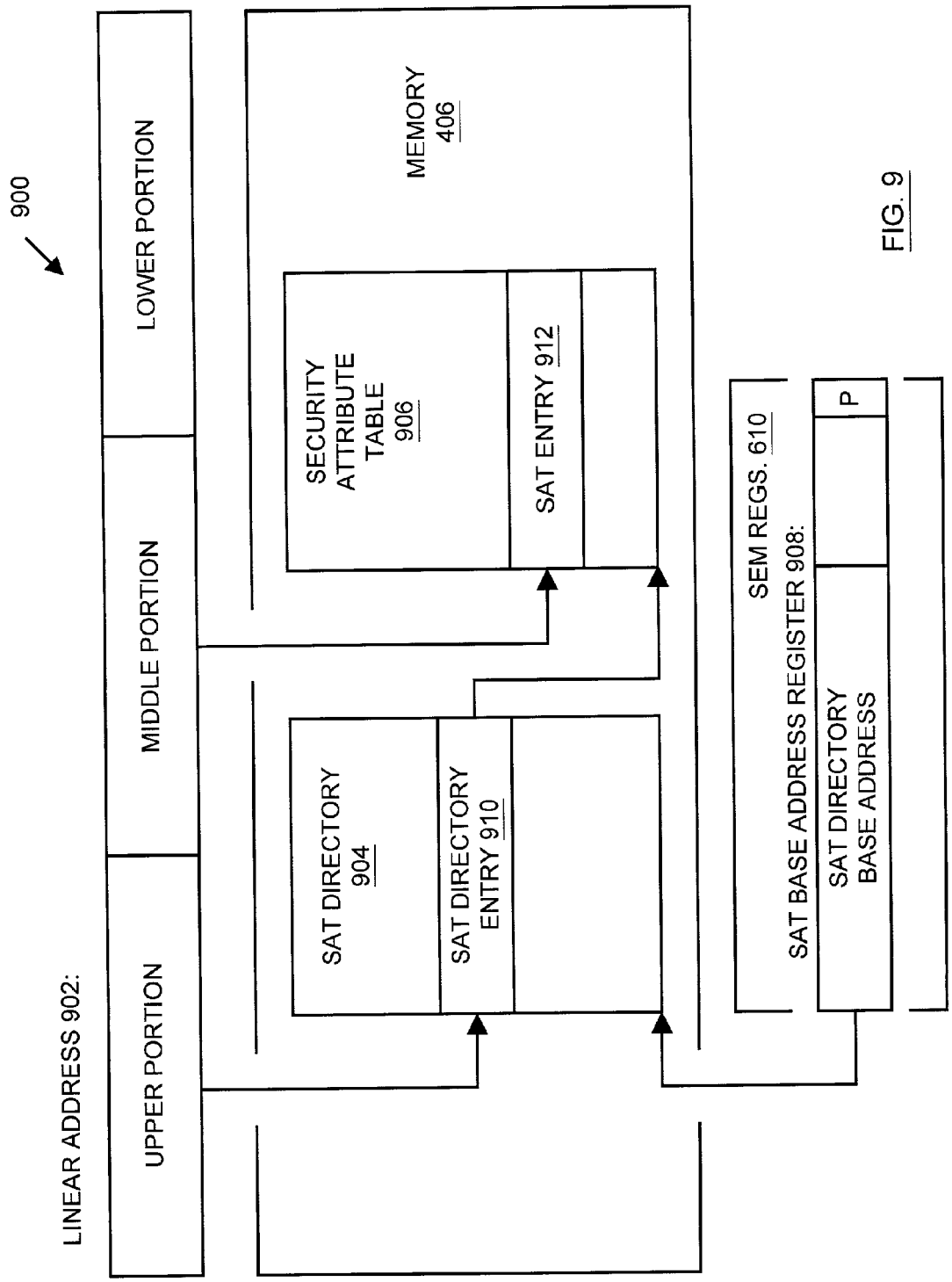
FIG. 9 is a diagram of one embodiment of a mechanism for accessing a security attribute table (SAT) entry of a given memory page to obtain additional security information of the given memory page.
Figure 10:
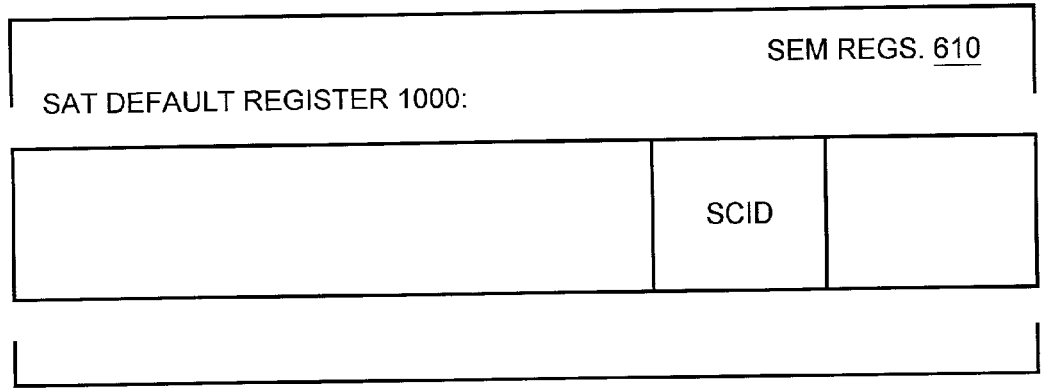
FIG. 10 is a diagram of one embodiment of a SAT default register.
Figure 11:
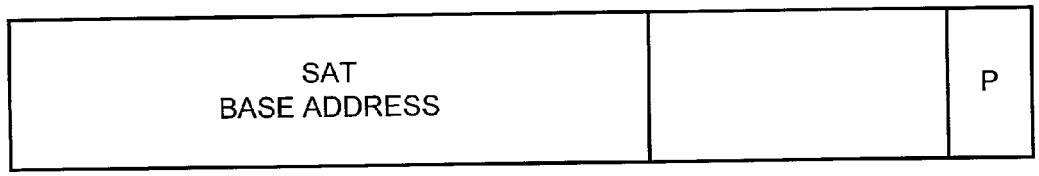
FIG. 11 is a diagram of one embodiment of a SAT directory entry format.

FIGS. 9-11 will now be used to describe how additional security information of a selected memory page is obtained within the computer system 400 of FIG. 4. FIG. 9 is a diagram of one embodiment of a mechanism 900 for accessing a SAT entry of the selected memory page to obtain additional security information of the selected memory page. The mechanism 900 of FIG. 9 may be embodied within the security check logic 800 of FIG. 8, and may be implemented when the computer system 400 of FIG. 4 is operating in the SEM. The mechanism 900 involves a linear address 902 produced by the segmentation unit 700 (FIG. 7) during execution of an instruction, an SAT directory 904, multiple SATs including a SAT 906, and a SAT base address register 908 of the set of SEM registers 610. The SAT directory 904 and the multiple SATs, including the SAT 906, are SEM data structures created and maintained by the security kernel 504 (FIG. 5). As described below, the SAT directory 904 (when present) and any needed SAT are copied into the memory 406 before being accessed.

The SAT base address register 908 includes a present (P) bit which indicates the presence of a valid SAT directory base address within the SAT base address register 908. The highest ordered (i.e., most significant) bits of the SAT base address register 908 are reserved for the SAT directory base address. The SAT directory base address is a base address of a memory page containing the SAT directory 904. If P=1, the SAT directory base address is valid, and SAT tables specify the security attributes of memory pages. If P=0, the SAT directory base address is not valid, no SAT tables exist, and security attributes of memory pages are determined by a SAT default register.

FIG. 10 is a diagram of one embodiment of the SAT default register 1000. In the embodiment of FIG. 10, the SAT default register 1000 includes a secure context identification (SCID) field. The SCID field includes multiple bit positions of the SAT default register 1000. The bit positions form a binary representation of an SCID value, wherein the SCID value is an integer value greater than or equal to 0. The SCID value indicates a default security context level for memory pages in the computer system 400. For example, where the SCID field includes n bits of the SAT default register 1000, a given memory page may occupy one of $2^n$ possible security context levels in the computer system 400.

The linear address 902 has a corresponding physical address residing in the selected memory page. The corresponding physical address is generated by the paging unit 702 (FIG. 7) using the address translation mechanism 100 of FIG. 1. Referring back to FIG. 9 and assuming the P bit of SAT base address register 908 is a '1', the linear address 902 produced by the segmentation unit 700 (FIG. 7) is divided into three portions to access the SAT entry of the selected memory page. As described above, the SAT directory base address of the SAT base address register 908 is the base address of the memory page containing the SAT directory 904. The SAT directory 904 includes multiple SAT directory entries, including a SAT directory entry 910. Each SAT directory entry may have a corresponding SAT in the memory 406. An "upper" portion of the linear address 902, including the highest ordered or most significant bits of the linear address 902, is used as an index into the SAT directory 904. The SAT directory entry 910 is selected from within the SAT directory 904 using the SAT directory base address of the SAT base address register 908 and the upper portion of the linear address 902.

FIG. 11 is a diagram of one embodiment of a SAT directory entry format 1100. In accordance with FIG. 11, each SAT directory entry includes a present (P) bit which indicates the presence of a valid SAT base address within the SAT directory entry. In the embodiment of FIG. 11, the highest ordered (i.e., the most significant) bits of each SAT directory entry are reserved for a SAT base address. The SAT base address is a base address of a memory page containing a corresponding SAT. If P=1, the SAT base address is valid, and the corresponding SAT is stored in the memory 406.

If P=0, the SAT base address is not valid, and the corresponding SAT does not exist in the memory 406 and must be copied into the memory 406 from a storage device (e.g., a disk drive). If P=0, the security check logic 800 may signal a page fault to logic within the paging unit 702, and the MMU 602 may forward the page fault signal to the execution unit 600 (FIG. 6). In response to the page fault signal, the execution unit 600 may execute a page fault handler routine which retrieves the needed SAT from the storage device, and store the needed SAT in the memory 406. After the needed SAT is stored in the memory 406, the P bit of the corresponding SAT directory entry is set to '1', and the mechanism 900 is continued. Alternately, if P=0, the contents of a SAT default base address field (not shown) of the SAT default register 1000 (FIG. 10) may be used as the SAT base address.

Figure 12:
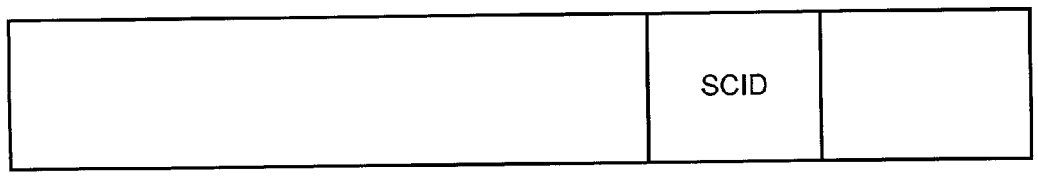
FIG. 12 is a diagram of one embodiment of a SAT entry format.

Referring back to FIG. 9, a "middle" portion of the linear address 902 is used as an index into the SAT 906. The SAT entry 906 is thus selected within the SAT 906 using the SAT base address of the SAT directory entry 910 and the middle portion of the linear address 902. FIG. 12 is a diagram of one embodiment of a SAT entry format 1200. In the embodiment of FIG. 12, each SAT entry includes a secure context identification (SCID) field. The SCID field includes multiple bit positions of the SAT entry. The bit positions form a binary representation of an SCID value, where the SCID value is an integer value greater than or equal to 0. The SCID value indicates a security context level of the selected memory page. For example, where the SCID field includes n bits of the SAT entry, the selected memory page may occupy one of $2^n$ possible security context levels in the computer system 400.

The BIU 606 (FIG. 6) retrieves needed SEM data structure entries from the memory 406, and provides the SEM data structure entries to the MMU 602. Referring back to FIG. 8, the security check logic 800 receives SEM data structure entries from the MMU 602 and the paging unit 702 via the communication bus. As described above, the SAT entry buffer 802 is used to store a relatively small number of SAT entries of recently accessed memory pages. The security check logic 800 stores a given SAT entry in the SAT entry buffer 802, along with a "tag" portion of the corresponding physical address.

During a subsequent memory page access, the security check logic 800 may compare a "tag" portion of a physical address produced by the paging unit 702 to tag portions of physical addresses corresponding to SAT entries stored in the SAT entry buffer 802. If the tag portion of the physical address matches a tag portion of a physical address corresponding to a SAT entry stored in the SAT entry buffer 802, the security check logic 800 may access the SAT entry in the SAT entry buffer 802, eliminating the need to perform the process of FIG. 9 to obtain the SAT entry from the memory 406. The security kernel 504 (FIG. 5) modifies the contents of the SAT base address register 908 in the CPU 402 (e.g., during context switches). In response to modifications of the SAT base address register 908, the security check logic 800 of the CPU SCU 416 may flush the SAT entry buffer 802.

In the embodiment of FIG. 7, the CPU SCU 416 is coupled to the paging unit 702. When the computer system 400 of FIG. 4 is operating in the SEM, the security check logic 800 receives the current privilege level (CPL) of the currently executing task (i.e., the currently executing instruction). The security check logic 800 also receives the page directory entry (PDE) U/S bit, the PDE R/W bit, the page table entry (PTE) U/S bit, and the PTE R/W bit of the selected memory page within which the corresponding physical address resides, from the paging unit 702. The security check logic 800 uses the above information, along with the SCID value of the SAT entry corresponding to the selected memory page, to determine if the memory 406 access is authorized.

The CPU 402 of FIG. 6 may be an x86 processor, and may include a code segment (CS) register, one of the 16-bit segment registers of the x86 processor architecture. Each segment register selects a block of memory (e.g., a segment of memory). In the protected mode with paging enabled, the CS register is loaded with a segment selector that indicates an executable block of the memory 406. The highest ordered (i.e., most significant) bits of the segment selector are used to store information indicating a block of memory (e.g., a segment of memory) including a next instruction to be executed by the execution unit 600 of the CPU 402 (FIG. 6). An instruction pointer (IP/EIP/RIP) register is used to store an offset into the block of memory (e.g., the segment of memory) indicated by the CS register. The CS:IP/EIP/RIP pair indicate a segmented address of the next instruction. The two lowest ordered (i.e., least significant) bits of the CS register are used to store a value indicating a current privilege level (CPL) of a task currently being executed by the execution unit 600 (i.e., the CPL of the current task).

Table 1 below illustrates exemplary rules for CPU-initiated (i.e., software-initiated) memory accesses when the computer system 400 of FIG. 4 is operating in the SEM. The CPU SCU 416 (FIGS. 4-8) and the security kernel 504 (FIG. 5) work together to implement the rules of Table 1 when the computer system 400 of FIG. 4 is operating in the SEM to provide additional security for data stored in the memory 406 over and above data security provided by the operating system 502 (FIG. 5).

In Table 1 below, "CEI-SCID" represents the SCID value of the currently executing instruction, and "SMP-SCID" represents the SCID value of the selected memory page. The CEI-SCID value is the SCID value of the SAT entry corresponding to the memory page containing the currently executing instruction. In the embodiment of Table 1, lower SCID values are associated with higher security context levels. In other embodiments, higher SCID values may be associated with higher security context levels.

TABLE 1

Exemplary Rules For Software-Initiated Memory Accesses
When The Computer System 400 Of FIG. 4 Is Operating In The SEM.

| SCID Comparison | CPL | Selected Memory Page U/S | R/W | Permitted Access | Remarks |
|---|---|---|---|---|---|
| CEI-SCID > SMP-SCID | X | X | X | None | SEM Security Exception asserted. |
| CEI-SCID <= SMP-SCID | 0 | X | 1(R/W) | R/W | Normal x86 protections apply: Full access granted. |
| CEI-SCID <= SMP-SCID | 0 | X | 0(R) | Read only | Normal x86 protections apply: Only read access. |
| CEI-SCID <= SMP-SCID | 3 | 0 | X | None | Normal x86 protections apply: GPF asserted. |
| CEI-SCID <= SMP-SCID | 3 | 1 | 1(R/W) | R/W | Normal x86 protections apply: Full access granted. |
| CEI-SCID <= SMP-SCID | 3 | 1 | 0(R) | Read only | Normal x86 protections apply: Only read access. |

In Table 1 above, the "CEI-SCID>SMP-SCID" condition is true when the integer value represented by the SCID value of the currently executing instruction is numerically greater than the integer value represented by the SCID value of the selected memory page. The "CEI-SCID<=SMP-SCID" condition is true when the integer value represented by the SCID value of the currently executing instruction is numerically less than or equal to the integer value represented by the SCID value of the selected memory page. The U/S bit of the selected memory page is the logical AND of the PDE U/S bit and the PTE U/S bit of the selected memory page. The R/W bit of the selected memory page is the logical AND of the PDE R/W bit and the PTE R/W bit of the selected memory page. The symbol "X" signifies a "don't care": the logical value may be either a '0' or a '1'.

Referring back to FIG. 8, the security check logic 800 of the CPU SCU 416 produces a general protection fault ("GPF") signal and a "SEM SECURITY EXCEPTION" signal, and provides the GPF and the SEM SECURITY EXCEPTION signals to logic within the MMU 602. When the security check logic 800 asserts the GPF signal, the MMU 602 forwards the GPF signal to the execution unit 600 (FIG. 6). In response to the GPF signal, the execution unit 600 may use the well-known interrupt descriptor table (IDT) vectoring mechanism of the x86 processor architecture to access and execute a GPF handler routine.

When the security check logic 800 asserts the SEM SECURITY EXCEPTION signal, the MMU 602 forwards the SEM SECURITY EXCEPTION signal to the execution unit 600. Unlike normal processor exceptions which use the IDT vectoring mechanism of the x86 processor architecture, a different vectoring method may be used to handle SEM security exceptions. SEM security exceptions may be dispatched through a pair of registers (e.g., model specific registers or MSRs) similar to the way x86 "SYSENTER" and "SYSEXIT" instructions operate. The pair of registers may be "security exception entry point" registers, and may define a branch target address for instruction execution when a SEM security exception occurs. The security exception entry point registers may define the code segment (CS), then instruction pointer (IP, or the 64-bit version RIP), stack segment (SS), and the stack pointer (SP, or the 64-bit version RSP) values to be used on entry to a SEM security exception handler. Under software control, the execution unit 600 (FIG. 6) may push the previous SS, SP/RSP, EFLAGS, CS, and IP/RIP values onto a new stack to indicate where the exception occurred. In addition, the execution unit 600 may push an error code onto the stack. It is noted that a normal return from interrupt (IRET) instruction may not be used as the previous SS and SP/RSP values are always saved, and a stack switch is always accomplished, even if a change in CPL does not occur. Accordingly, a new instruction may be defined to accomplish a return from the SEM security exception handler.

Figure 13A:
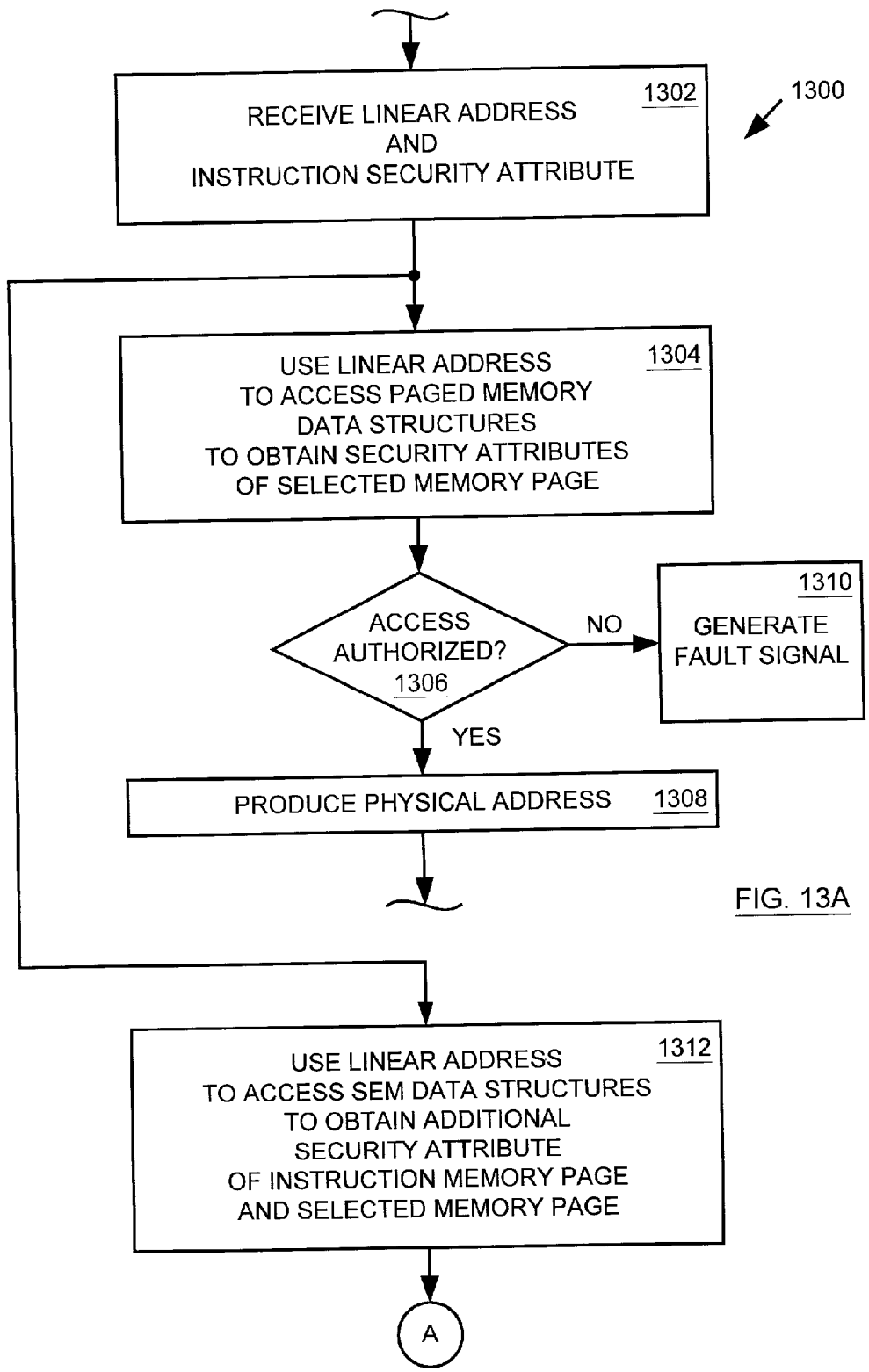
FIGS. 13A and 13B in combination form a flow chart of one embodiment of a method for managing a memory used to store data arranged within multiple memory pages.
Figure 13B:
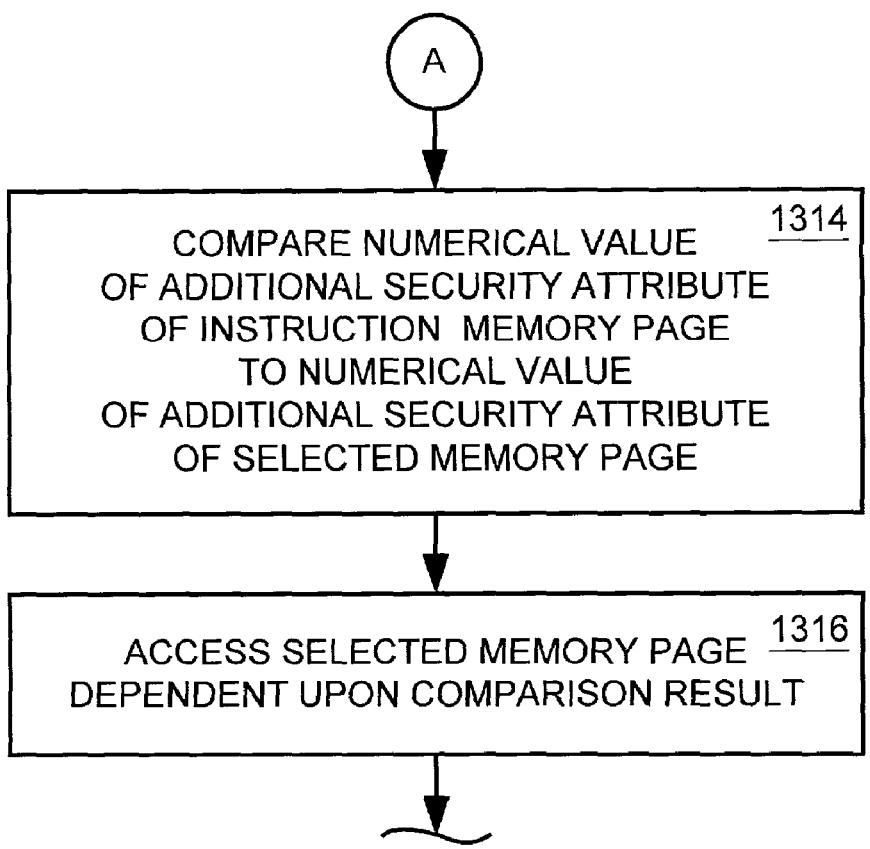

FIGS. 13A and 13B in combination form a flow chart of one embodiment of a method 1300 for providing access security for a memory used to store data arranged within multiple memory pages. The method 1300 may, for example, reflect the exemplary rules of Table 1 for CPU-initiated (i.e., software-initiated) memory accesses when the computer system 400 of FIG. 4 is operating in the SEM. The method 1300 may be embodied within the MMU 602 (FIGS. 6-7).

During a step 1302 of the method 1300, a linear address produced during execution of an instruction is received, along with a security attribute of the instruction (e.g., a CPL of a task including the instruction). The instruction resides in a first memory page. During a step 1304, the linear address is used to access at least one paged memory data structure located in the memory (e.g., a page directory and a page table) to obtain a base address of a selected memory page and security attributes of the selected memory page. The security attributes of the selected memory page may include, for example, a U/S bit and a R/W bit of a page directory entry and a U/S bit and a R/W bit of a page table entry.

During a decision step 1306, the security attribute of the instruction and the security attributes of the selected memory page are used to determine whether or not the access is authorized. If the access is authorized, the base address of the selected memory page and an offset are combined during a step 1308 to produce a physical address within the selected memory page. If the access is not authorized, a fault signal (e.g., a general protection fault signal or GPF signal) is generated during a step 1310.

During a step 1312, which may be carried out substantially at the same time as the step 1304 (i.e., substantially in parallel with the step 1304), at least one security attribute data structure located in the memory (e.g., the SAT directory 904 of FIG. 9 and a SAT) is accessed using the linear address produced during execution of the instruction to obtain an additional security attribute of the first memory page, wherein the first memory page includes the instruction, and an additional security attribute of the selected memory page, wherein the selected memory page includes the physical address corresponding to the linear address. The additional security attribute of the first memory page may include, for example, a security context identification (SCID) value as described above, wherein the SCID value indicates a security context level of the first memory page. Similarly, the additional security attribute of the selected memory page may include an SCID value, wherein the SCID value indicates a security context level of the selected memory page.

During a step 1314, a numerical value conveyed by the additional security attribute of the first memory page is compared to a numerical value conveyed by the additional security attribute of selected memory page. The selected memory page is accessed during a step 1316 dependent upon a result of the comparing of the numerical values conveyed by the security attribute of the first memory page and the additional security attribute of selected memory page.

For example, where the method 1300 reflects the exemplary rules of Table 1 above for CPU-initiated (i.e., software-initiated) memory accesses when the computer system 400 of FIG. 4 is operating in the SEM, the selected memory page may be accessed during the step 1316 only if the integer value represented by the SCID value of the instruction is numerically less than or equal to the integer value represented by the SCID value of the selected memory page (i.e., if CEI-SCID<=SMP_SCID). If, on the other hand, the integer value represented by the SCID value of the instruction is numerically greater than the integer value represented by the SCID value of the selected memory page (i.e., if CEI-SCID>SMP_SCID), the selected memory page may not be accessed during the step 1316. In this situation, the SEM SECURITY EXCEPTION signal may be asserted as indicated in Table 1 and described above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A memory management unit for managing a memory storing data arranged within a plurality of memory pages, the memory management unit comprising:
   a security check unit coupled to receive a linear address generated during execution of a current instruction, wherein the linear address has a corresponding physical address residing within a selected memory page, and wherein the security check unit is configured to use the linear address to access a paged memory data structure located in the memory to obtain a set of first security attributes of the selected memory page, wherein the set of first security attributes is used to determine whether the current instruction is authorized to access the selected memory page, and wherein the security check unit is configured to use the linear address to access at least one security attribute data structure located in the memory to obtain a second security attribute of the selected memory page, to compare a numerical value conveyed by a security attribute of the current instruction to a numerical value conveyed by the second security attribute of the selected memory page, and to produce an output signal dependent upon a result of the comparison; and
   wherein the memory management unit is configured to access the selected memory page dependent upon the output signal.

2. The memory management unit as recited in claim 1, wherein the at least one security attribute data structure comprises a security attribute table directory and at least one security attribute table.

3. The memory management unit as recited in claim 2, wherein the security attribute table directory comprises a plurality of entries, and where each entry of the security attribute table directory includes a present bit and a security attribute table base address field, and wherein the present bit indicates whether or not a security attribute table corresponding to the security attribute table directory entry is present in the memory, and wherein the security attribute table base address field is reserved for a base address of the security attribute table corresponding to the security attribute table directory entry.

4. The memory management unit as recited in claim 2, wherein the at least one security attribute table comprises a plurality of entries, and where each entry of the security attribute table includes a security context identification (SCID) field, and wherein the SCID field includes a plurality of bit positions, and wherein the bit positions form a binary representation of an SCID value, and wherein the SCID value is an integer value greater than or equal to 0, and wherein the SCID value indicates a security context level of a corresponding memory page.

5. The memory management unit as recited in claim 1, wherein the second security attribute of the selected memory page comprises a security context identification (SCID) value, and wherein the SCID value is an integer value greater than or equal to 0 and indicates a security context level of the selected memory page.

6. The memory management unit as recited in claim 1, wherein the second security attribute of the current instruction comprises a security context identification (SCID) value, and wherein the SCID value is an integer value greater than or equal to 0 and indicates a security context level of a memory page containing the current instruction.

7. The memory management unit as recited in claim 1, wherein the security check logic is configured to obtain the second security attribute of the current instruction from the at least one security attribute data structure.

8. The memory management unit as recited in claim 1, wherein the output signal is a fault signal.

9. The memory management unit as recited in claim 1, wherein the security check unit is configured to receive the set of first security attributes of the selected memory page in addition to the second security attribute of selected memory page, and to produce the output signal dependent upon: (i) the result of the comparison of the numerical value conveyed by the security attribute of the current instruction to the numerical value conveyed by the second security attribute of selected memory page, and (ii) the set of first security attributes of the selected memory page.

10. The memory management unit as recited in claim 9, wherein the set of first security attributes of the selected memory page comprise a user/supervisor (U/S) bit and a read/write (R/W) bit as defined by the x86 processor architecture, and wherein U/S=0 indicates the selected memory page is an operating system memory page and corresponds to a supervisor level of the operating system, and wherein U/S=1 indicates the selected memory page is a user memory page and corresponds to a user level of the operating system, and wherein R/W=0 indicates only read accesses are allowed to the selected memory page, and wherein R/W=1 indicates that both read and write accesses are allowed to the selected memory page.

11. A central processing unit, comprising:
an execution unit operably coupled to a memory, wherein the execution unit is configured to fetch instructions from the memory and to execute the instructions; and
a memory management unit (MMU) operably coupled to the memory and configured to manage the memory, wherein the MMU is configurable to manage the memory such that the memory stores data arranged within a plurality of memory pages, and wherein the MMU comprises:
a security check unit coupled to receive a linear address generated by the execution unit during execution of a current instruction, wherein the linear address has a corresponding physical address that resides within a selected memory page, and wherein the security check unit is configured to use the linear address to access a paged memory data structure located in the memory to obtain a set of first security attributes of the selected memory page, wherein the set of first security attributes is used to determine whether the current instruction is authorized to access the selected memory page, and wherein the security check unit is configured to use the linear address to access at least one security attribute data structure located in the memory to obtain a second security attribute of the selected memory page, to compare a numerical value conveyed by a security attribute of the current instruction to a numerical value conveyed by the second security attribute of selected memory page, and to produce an output signal dependent upon a result of the comparison; and
wherein the MMU is configured to access the selected memory page dependent upon the output signal.

12. A computer system, comprising:
a memory for storing data, wherein the data includes instructions;
a central processing unit (CPU), comprising:
an execution unit operably coupled to the memory, wherein the execution unit is configured to fetch instructions from the memory and to execute the instructions; and
a memory management unit (MMU) operably coupled to the memory and configured to manage the memory, wherein the MMU is configurable to manage the memory such that the memory stores the data arranged within a plurality of memory pages, and wherein the MMU comprises:
a security check unit coupled to receive a linear address generated by the execution unit during execution of a current instruction, wherein the linear address has a corresponding physical address residing within a selected memory page, and wherein the security check unit is configured to use the linear address to access a paged memory data structure located in the memory to obtain a set of first security attributes of the selected memory page, wherein the set of first security attributes is used to determine whether the current instruction is authorized to access the selected memory page, and wherein the security check unit is configured to use the linear address to access at least one security attribute data structure located in the memory to obtain a second security attribute of the selected memory page, to compare a numerical value conveyed by a security attribute of the current instruction to a numerical value conveyed by the second security attribute of selected memory page, and to produce an output signal dependent upon a result of the comparison; and
wherein the MMU is configured to access the selected memory page dependent upon the output signal.

13. A memory management unit for managing a memory storing data arranged within a plurality of memory pages, the memory management unit comprising:
a paging unit coupled to the memory and to receive a linear address produced during execution of a current instruction, and configured to use the linear address to produce a physical address within a selected memory page, wherein the paging unit is configured to use the linear address to access at least one paged memory data structure located in the memory to obtain security attributes of the selected memory page, and wherein the paging unit is configured to produce a fault signal dependent upon the security attributes of the selected memory page; and
a security check unit coupled to receive the linear address produced during execution of the current instruction, and wherein the security check unit is configured to use the linear address to access at least one security attribute data structure located in the memory to obtain an additional security attribute of the selected memory page, to compare a numerical value conveyed by a security attribute of the current instruction to a numerical value conveyed by the additional security attribute of selected memory page, and to produce an output signal dependent upon a result of the comparison; and
wherein the memory management unit is configured to access the selected memory page dependent upon the output signal.

14. The memory management unit as recited in claim 13, wherein the at least one security attribute data structure comprises a security attribute table directory and at least one security attribute table.

15. The memory management unit as recited in claim 14, wherein the security attribute table directory comprises a plurality of entries, and where each entry of the security attribute table directory includes a present bit and a security attribute table base address field, and wherein the present bit indicates whether or not a security attribute table corresponding to the security attribute table directory entry is present in the memory, and wherein the security attribute table base address field is reserved for a base address of the security attribute table corresponding to the security attribute table directory entry.

16. The memory management unit as recited in claim 14, wherein the at least one security attribute table comprises a plurality of entries, and where each entry of the security attribute table includes a security context identification (SCID) field, and wherein the SCID field includes a plurality of bit positions, and wherein the bit positions form a binary representation of an SCID value, and wherein the SCID value is an integer value greater than or equal to 0, and wherein the SCID value indicates a security context level of a corresponding memory page.

17. The memory management unit as recited in claim 13, wherein the additional security attribute of the selected memory page comprises a security context identification (SCID) value, and wherein the SCID value is an integer value greater than or equal to 0 and indicates a security context level of the selected memory page.

18. The memory management unit as recited in claim 13, wherein the security attribute of the current instruction comprises a security context identification (SCID) value, and wherein the SCID value is an integer value greater than or equal to 0 and indicates a security context level of a memory page containing the current instruction.

19. The memory management unit as recited in claim 13, wherein the security check unit is coupled to receive a current privilege level (CPL) of a current task including the current instruction, and configured to produce the output signal dependent upon: (i) the result of the comparison of the numerical values conveyed by the security attribute of the current instruction and the security attribute of selected memory page, and (ii) the CPL of the current task including the current instruction.

20. The memory management unit as recited in claim 13, wherein the physical address within the selected memory page includes a base address and an offset, and wherein the paging unit is configured to obtain the base address from the at least one paged memory data structure.

21. The memory management unit as recited in claim 13, wherein the at least one paged memory data structure comprises a page directory and at least one page table as defined by the x86 processor architecture.

22. The memory management unit as recited in claim 13, wherein the security attributes of the selected memory page comprise a user/supervisor (U/S) bit and a read/write (R/W) bit as defined by the x86 processor architecture, and wherein U/S=0 indicates the selected memory page is an operating system memory page and corresponds to a supervisor level of the operating system, and wherein U/S=1 indicates the selected memory page is a user memory page and corresponds to a user level of the operating system, and wherein R/W=0 indicates only read accesses are allowed to the selected memory page, and wherein R/W=1 indicates that both read and write accesses are allowed to the selected memory page.

23. A memory management unit for managing a memory storing data arranged within a plurality of memory pages, the memory management unit comprising:
a paging unit coupled to the memory and to receive a linear address produced during execution of a current instruction residing within a first memory page, wherein the paging unit is configured to use the linear address to produce a physical address accessed by the current instruction, and wherein the physical address includes a base address of a selected memory page and an offset, and wherein the paging unit is configured to access at least one paged memory data structure located in the memory using the linear address to obtain the base address and security attributes of the selected memory page, and wherein the paging unit is configured to receive a security attribute of the instruction, and wherein the paging unit is configured to produce a fault signal dependent upon the security attribute of the instruction and the security attributes of the selected memory page; and
a security check unit coupled to receive the security attribute of the instruction, the security attributes of the selected memory page, and the linear address produced during execution of the current instruction, and wherein the security check unit is configured to use the linear address to access at least one security attribute data structure located in the memory to obtain an additional security attribute of the selected memory page, to compare a numerical value conveyed by a security attribute of the current instruction to a numerical value conveyed by the additional security attribute of selected memory page, and to produce an output signal dependent upon a result of the comparison; and
wherein the memory management unit is configured to access the selected memory page dependent upon the output signal.

24. The memory management unit as recited in claim 23, wherein the at least one paged memory data structure comprises a page directory and at least one page table as defined by the x86 processor architecture.

25. The memory management unit as recited in claim 23, wherein the security attribute of the current instruction comprises a current privilege level (CPL) of a task including the current instruction as defined by the x86 processor architecture.

26. The memory management unit as recited in claim 23, wherein the security attributes of the selected memory page comprise a user/supervisor (U/S) bit a read/write (R/W) bit as defined by the x86 processor architecture, and wherein U/S=0 indicates the selected memory page is an operating system memory page and corresponds to a supervisor level of the operating system, and wherein U/S=1 indicates the selected memory page is a user memory page and corresponds to a user level of the operating system, and wherein R/W=0 indicates only read accesses are allowed to the selected memory page, and wherein R/W=1 indicates that both read and write accesses are allowed to the selected memory page.

27. The memory management unit as recited in claim 23, wherein the additional security attribute of the selected memory page comprises a security context identification (SCID) value, and wherein the SCID value is an integer value greater than or equal to 0 and indicates a security context level of the selected memory page.

28. The memory management unit as recited in claim 23, wherein the security attribute of the current instruction comprises a security context identification (SCID) value, and wherein the SCID value is an integer value greater than or equal to 0 and indicates a security context level of the first memory page containing the current instruction.

29. The memory management unit as recited in claim 23, wherein the at least one security attribute data structure comprises a security attribute table directory and at least one security attribute table.

30. The memory management unit as recited in claim 29, wherein the security attribute table directory comprises a plurality of entries, and where each entry of the security attribute table directory includes a present bit and a security attribute table base address field, and wherein the present bit indicates whether or not a security attribute table corresponding to the security attribute table directory entry is present in the memory, and wherein the security attribute table base address field is reserved for a base address of the security attribute table corresponding to the security attribute table directory entry.

31. The memory management unit as recited in claim 29, wherein the at least one security attribute table comprises a plurality of entries, and where each entry of the security attribute table includes security context identification (SCID) field, and wherein the SCID field includes a plurality of bit positions, and wherein the bit positions form a binary representation of an SCID value, and wherein the SCID value is an integer value greater than or equal to 0, and wherein the SCID value indicates a security context level of a corresponding memory page.

32. The method as recited in claim 31, wherein the combining comprises:
combining the base address of the selected memory page with an offset to produce a physical address within the selected memory page if the security attribute of the instruction and the security attributes of the selected memory page indicate the access is authorized, wherein the security attributes of the selected memory page comprise a user/supervisor (U/S) bit a read/write (R/W) bit as defined by the x86 processor architecture, and wherein U/S=0 indicates the selected memory page is an operating system memory page and corresponds to a supervisor level of the operating system, and wherein U/S=1 indicates the selected memory page is a user memory page and corresponds to a user level of the operating system, and wherein R/W=0 indicates only read accesses are allowed to the selected memory page, and wherein R/W=1 indicates that both read and write accesses are allowed to the selected memory page.

33. The method as recited in claim 31, wherein the generating comprises:
generating a fault signal if the security attribute of the instruction and the security attributes of the selected memory page indicate the access is not authorized, wherein the fault signal is a general protection fault (GPF) signal as defined by the x86 processor architecture.

34. The method as recited in claim 31, wherein the accessing comprises:
accessing at least one security attribute data structure located in the memory using the linear address produced during execution of the instruction to obtain an additional security attribute of the first memory page and an additional security attribute of the selected memory page, wherein the at least one security attribute data structure comprises a security attribute table directory and at least one security attribute table, and wherein the additional security attribute of the first memory page comprises a security context identification (SCID) value of the first memory page, and wherein the SCID value of the first memory page is an integer value greater than or equal to 0 and indicates a security context level of the first memory page, and wherein the additional security attribute of the selected memory page comprises a security context identification (SCID) value of the selected memory page, and wherein the SCID value of the selected memory page is an integer value greater than or equal to 0 and indicates a security context level of the selected memory page.

35. A method for providing access security for a memory used to store data arranged within a plurality of memory pages, the method comprising:
receiving a linear address produced during execution of an instruction and a security attribute of the instruction, wherein the instruction resides in a first memory page;
using the linear address to access at least one paged memory data structure located in the memory to obtain a base address of a selected memory page and security attributes of the selected memory page;
combining the base address of the selected memory page with an offset to produce a physical address within the selected memory page if the security attribute of the instruction and the security attributes of the selected memory page indicate the access is authorized;
generating a fault signal if the security attribute of the instruction and the security attributes of the selected memory page indicate the access is not authorized;
accessing at least one security attribute data structure located in the memory using the linear address produced during execution of the instruction to obtain an additional security attribute of the first memory page and an additional security attribute of the selected memory page;
comparing a numerical value conveyed by an additional security attribute of the first memory page to a numerical value conveyed by the additional security attribute of selected memory page; and
accessing the selected memory page dependent upon a result of the comparing of the numerical values conveyed by the security attribute of the first memory page and the additional security attribute of selected memory page.

36. The method as recited in claim 35, wherein the receiving comprises:
receiving a linear address produced during execution of an instruction and a security attribute of the instruction, wherein the instruction resides in a first memory page, and wherein the security attribute of the instruction comprises a current privilege level (CPL) of a task including the instruction as defined by the x86 processor architecture.

37. The method as recited in claim 35, wherein the using comprises:
using the linear address to access at least one paged memory data structure located in the memory to obtain a base address of a selected memory page and security attributes of the selected memory page, wherein the at least one paged memory data structure comprises a page directory and at least one page table as defined by the x86 processor architecture.

* * * * *